Sept. 5, 1967  L. FROSTAD  3,339,598
SAW STRUCTURES
Filed Aug. 12, 1964  3 Sheets-Sheet 3
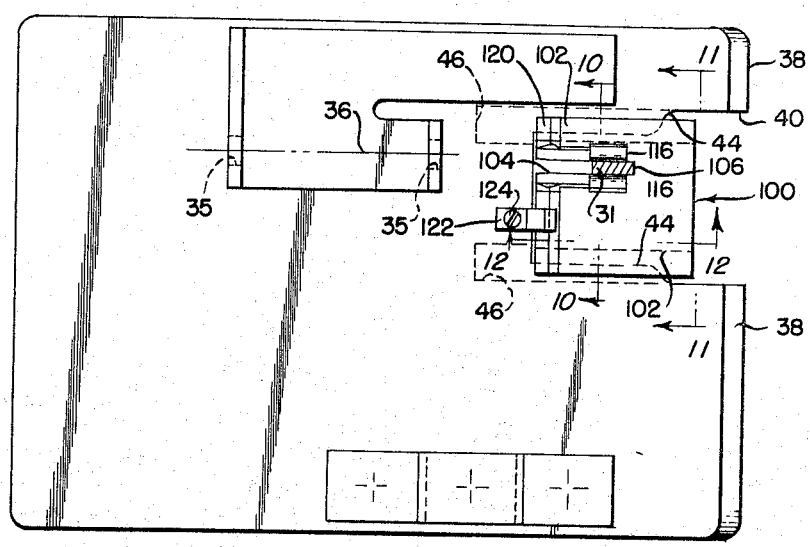
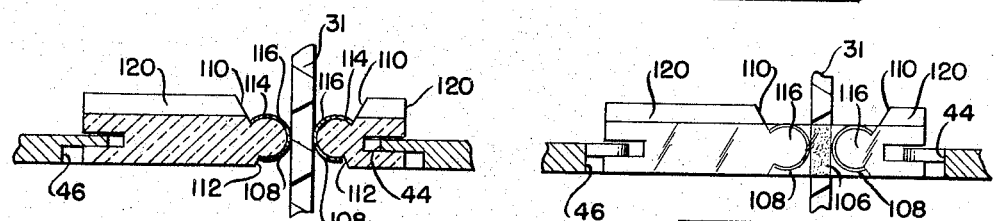
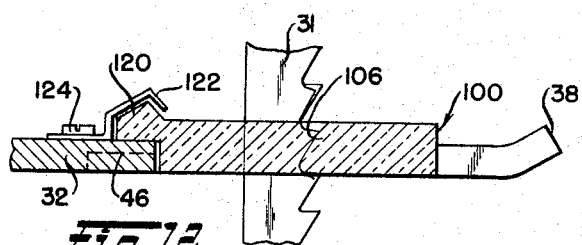
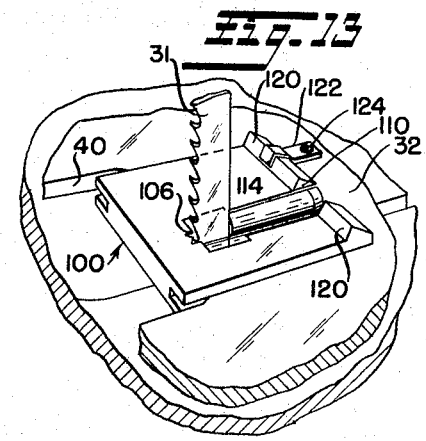
INVENTOR
LARS FROSTAD
BY *Strauch, Nolan & Neale*
ATTORNEYS United States Patent Office 3,339,598
Patented Sept. 5, 1967

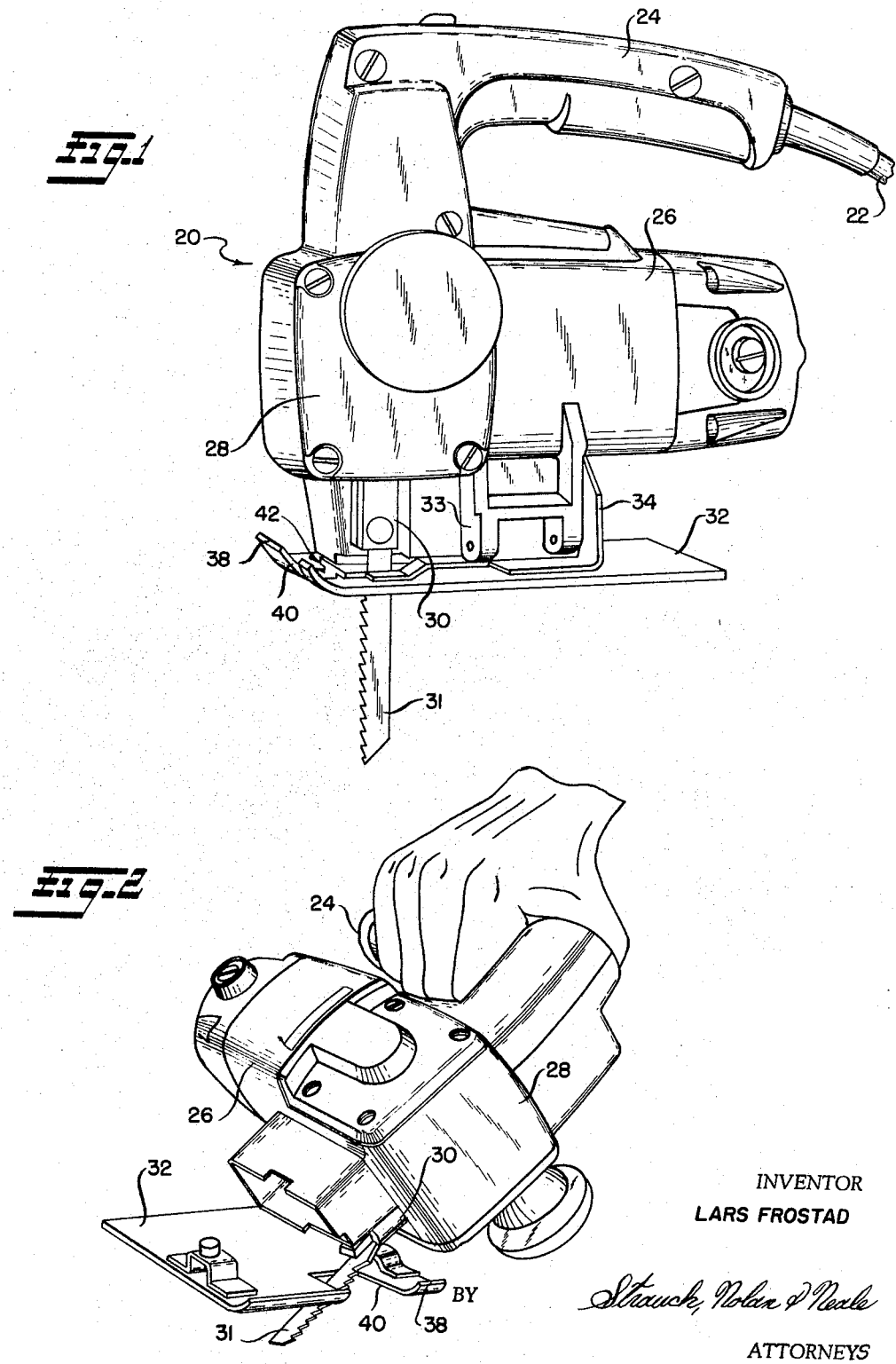

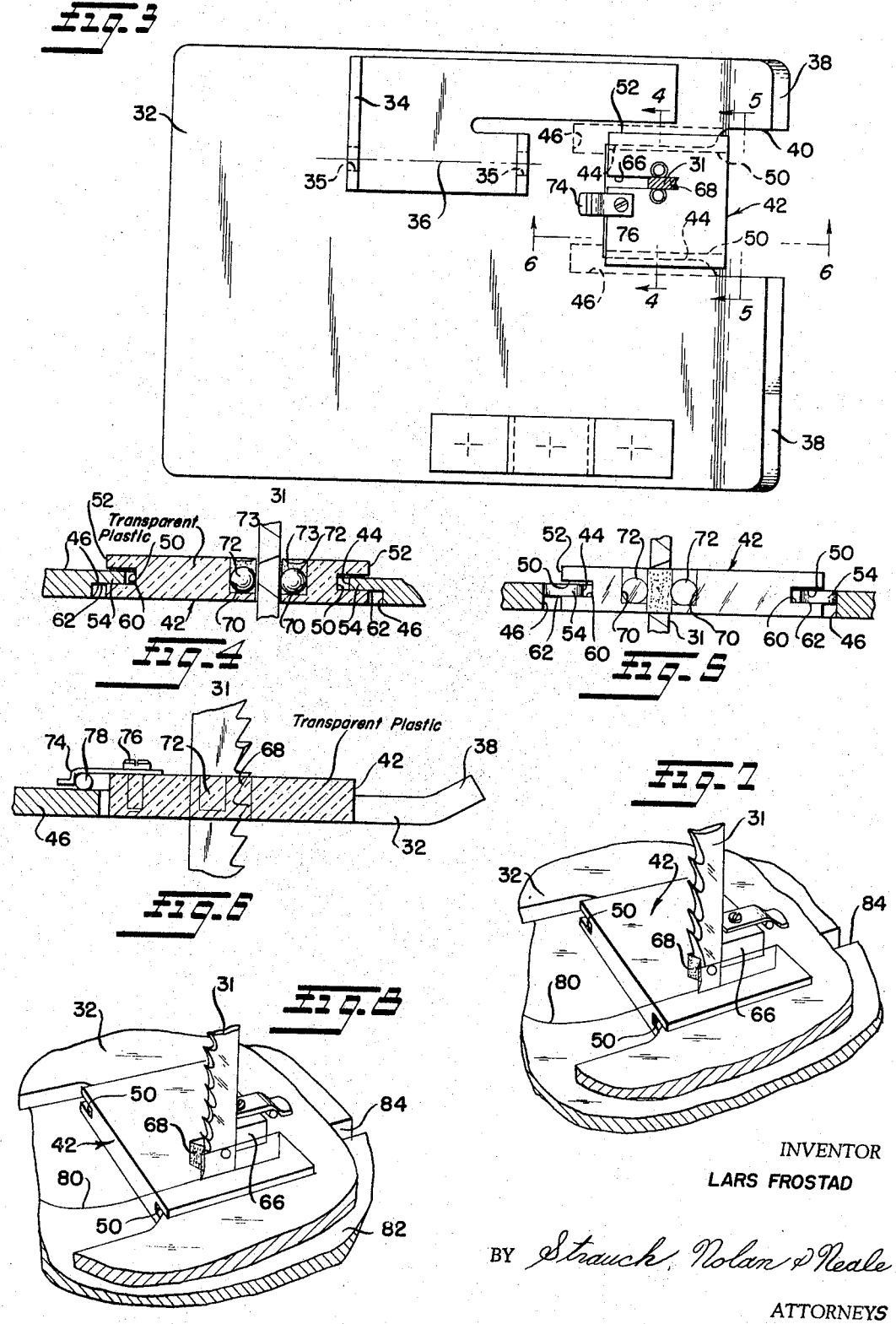

3,339,598
SAW STRUCTURES
Lars Frostad, Syracuse, N.Y., assignor to Rockwell Manufacturing Company, Pittsburgh, Pa., a corporation of Pennsylvania
Filed Aug. 12, 1964, Ser. No. 389,082
5 Claims. (Cl. 143—68)

This invention relates to saber, bayonet, or other types of saws having a similarly directed cutting action, and more particularly to anti-splintering insert structures for such saws.

Bayonet saws conventionally include a motor, a blade actuator mechanism, and a flat workpiece-engaging base. A replaceable bayonet-like saw blade is connected to the actuator mechanism and extends perpendicularly beyond the plane of the saw base to cut a workpiece positioned adjacent thereto. In all bayonet saws, the blade actuator mechanism imparts a reciprocating motion to the blade, and in high speed bayonet saws it imparts an aggressive motion to the blade relative to the workpiece as shown in United States Letters Patent No. 2,737,984 to Bruck. As there disclosed, an orbital reciprocation advances the blade into the workpiece on the cutting stroke and relieves the blade rearwardly away from the workpiece on the return stroke.

The teeth on bayonet blades are oriented to accomplish cutting on the blade stroke toward the saw base so as to tend to pull the saw unit and the workpiece firmly together during the cutting action. This type of cutting motion, of course, tends to pull or separate splinters and chips on the cutting stroke from the upper surface of the workpiece on both sides of the saw kerf and results in an unsightly and imperfect saw cut. This problem is particularly acute when utilizing a bayonet saw on laminated materials such as plywood or laminated plastic compositions wherein the top laminations of the material tend to layer, that is, separate from the remainder of the workpiece, during the cutting stroke.

Because of the relationship between the direction of the cutting stroke and the position of the saw and the operator in portable power driven saws, it is not possible to practice the common stationary-power-saw techniques to prevent splintering, chipping, or layering (hereinafter generically called separating). For example, in stationary saws scrap material placed between the workpiece and the saw base will completely support the workpiece material to prevent separation, but in portable power saws a guide line drawn on the workpiece would be covered by the scrap material, and the technique is therefore not practical.

As shown by United States Letters Patent No. 2,842,170 to Bruck et al., No. 2,996,089 to McCarty, and No. 3,045,725 to McCarty et al., prior art efforts to solve this separation problem in bayonet-type saws have involved opaque slotted inserts loosely mounted in the saw base to closely fit the two sides of the blade. Although the slot is open in front, the operator has only a limited view of a guide line, particularly on curves, because of the opaque forwardly extending, narrowly spaced side walls of the slot; this problem is particularly acute in the structure of the last two patents mentioned above. Unfortunately, such prior art inserts still permit a certain amount of separation at the upper workpiece surface which is unacceptable for high quality cabinetry and similar work where a substantially perfect cut is needed.

Copending patent application Ser. No. 380,364 filed July 6, 1964, now U.S. Patent No. 3,303,861, shows an improved anti-separation base structure for bayonet saws which obviates the disadvantages of the prior art devices by incorporating a transparent element fixedly mounted upon the base of a bayonet saw to closely envelop the sides and front of the path of upward motion of the blade teeth at the cutting area to fully support the workpiece material so as to prevent tearing or chipping along the saw kerf. The present invention is an improvement on the structure of this copending application.

The present invention is characterized by a transparent insert adapted to be detachably mounted in a bayonet saw base to engage the upper surface of the workpiece. The insert is mounted so that it is free to move within predetermined limits in the plane of the base, for purposes described below, but is restrained from moving perpendicularly to the base to thereby define a firm support for the upper portions of the workpiece during the cutting action. The insert is constructed so that when it is thus mounted upon a saw with a blade mounted therein, the blade protrudes through an aperture in the transparent insert so that the path of upward motion of the blade teeth is closely embraced or surrounded by the transparent material so as to fully support the workpiece material closely around the cutting area to prevent splintering. Because of the transparent nature of the insert, this advantageous close support of the workpiece material is accomplished without inhibiting visibility of a guide line at the point where the teeth are cutting.

The insert preferably incorporates blade guide or bearing elements to prevent or minimize relative twisting or lateral motion between the blade and the insert to obviate undue wear on the transparent insert material. However, as the insert is mounted to permit movement in the plane of the base, the blade and insert can move or twist together with respect to the saw and base to allow the blade to deflect when cutting curves, for example, without creating undue friction and binding between the blade and the transparent insert.

In one specific embodiment the transparent insert is constructed with a blade receiving slot having a closed front end to provide the above-described close enclosure of the path of the blade teeth on the cutting stroke. The rear end of the slot is preferably open, and the insert is therefore adapted to be inserted from the front of the saw into an open-front, insert-receiving aperture in the saw base without the inconvenience of removing the blade. With this arrangement the insert can be readily detached from said saw as necessary, for example, for angle cutting. Upon reinsertion of the insert in the base aperture, an insert retaining device holds the insert in operative enveloping position adjacent the blade without restricting insert movement or play in the plane of the base.

The slot front end is preferably translucent to provide a readily visible guide mark immediately adjacent the point where the blade teeth emerge from the workpiece. Further, the slot front end is preferably shaped to closely fit the cross-sectional profile of the blade teeth to increase the efficacy of the insert in holding down the workpiece material directly in front of the blade. As the blade teeth conventionally have a concave V-shaped profile, the slot front end has a corresponding convex V-shape. Further, the blade guide elements are preferably in the form of metallic members rigidly fitted in the insert adjacent the blade slot to closely engage and guide the sides of the blade to the rear of its teeth to prevent wear on the transparent insert material.

The present invention is thus effective to prevent separation at the upper portions of the workpiece even during normal blade deflections in the cutting action because the insert is freely movable in the plane of the base. The insert blade aperture can therefore be maintained in close enclosing relation to the front edge of the saw blade at all times to support the upper workpiece surface ahead of, as well as to either side of, the blade. At the same time, the transparency of the base element permits clear visibility from any angle of the exact positional relationship between the cutting edge of the blade and the workpiece guide line right at the intersection therebetween.

Accordingly, a primary object of the present invention is to provide improved anti-separation base structures for saws which overcome the disadvantages of prior art devices.

Other objects of the present invention include:

(1) The provision of improved, transparent, anti-separation base attachment for bayonet-type saws to closely envelop the cutting action at the upper workpiece surface while permitting normal blade deflections during cutting without binding between blade and base attachments;

(2) The provision of improved, laterally movable or floating anti-separation inserts for bayonet-type saws which facilitate visibility of the saw-blade-to-guide-line alignment;

(3) The provision of improved, laterally movable or floating, anti-separation, bayonet saw inserts which are readily insertable in the saw base without first removing the saw blade;

(4) In conjunction with the preceding object, the provision of novel retaining means to maintain laterally movable or floating anti-separation inserts in operative position in bayonet saws;

(5) The provision of improved, laterally floating anti-separation inserts for bayonet saws which are movable in the plane of the saw base and which have blade slots closely fitting the cross-sectional profile of the front of the blade teeth to prevent lifting of portions of the workpiece thereat; and (6) The provision of laterally floating or movable transparent anti-separation inserts for saw bases having a blade enclosing slot closed at its front end and open at its rear end and having bearing means on either side of the slot to engage the sides of the saw blade and thereby prevent wear on the transparent material of the insert.

These and other objects of the present invention will more fully appear from the following description and appended claims when read in conjunction with the accompanying drawings, wherein:

FIGURE 1 is a perspective view of a bayonet saw with an anti-separation insert according to the present invention;

FIGURE 2 is a perspective view of the bayonet saw of FIGURE 1 without the insert and in a position for angle cutting;

FIGURE 3 is a top view of the base of the bayonet saw of FIGURE 1 with the anti-separation insert in place therein;

FIGURE 4 is a fragmentary, transverse vertical section through the base and insert taken substantially along line 4—4 of FIGURE 3;

FIGURE 5 is a fragmentary, transverse vertical section through the base and insert taken substantially along line 5—5 of FIGURE 3;

FIGURE 6 is a fragmentary, longitudinal vertical section through the base and insert taken substantially on line 6—6 of FIGURE 3;

FIGURE 7 is a fragmentary perspective view of the base of the bayonet saw of FIGURE 1 and shows the insert-blade relationship on a cutting stroke of the saw blade;

FIGURE 8 is a fragmentary perspective view similar to FIGURE 7 but shows the insert-blade relationship on a return stroke of the blade;

FIGURE 9 is a top view of the base of the bayonet saw of FIGURE 1 with a modified embodiment of the transparent insert of the present invention therein;

FIGURE 10 is a fragmentary, transverse vertical section through the base and insert taken substantially on line 10—10 of FIGURE 9;

FIGURE 11 is a fragmentary, transverse vertical section through the base and insert taken substantially on line 11—11 of FIGURE 9;

FIGURE 12 is a fragmentary, longitudinal vertical section through the base and insert taken substantially on line 12—12 of FIGURE 9;

FIGURE 13 is a fragmentary perspective view of the base of the bayonet saw and shows the insert-blade relation on a cutting stroke in the modified insert embodiment of FIGURE 9; and FIGURE 14 is a fragmentary perspective view similar to FIGURE 13 but shows the insert-blade relationship upon a return stroke.

As shown generally in FIGURES 1, 2, and 3, bayonet saw 20 includes a power cord 22, a handle 24, an enclosed motor 26, a blade actuating mechanism 28, and a blade holder 30 adapted to detachably mount a blade 31. These elements are all pivotally mounted upon a base 32 by a motor bracket 33 and a base bracket 34 having bores 35 defining the pivoting axis 36. Base 32 is a plate-like member having an upturned forward edge 38 and a generally rectangular aperture 40 extending rearwardly into the plate from edge 38. A transparent insert 42 is adapted to fit into aperture 40 with lateral and angular play in the plane of base 32 and to closely enclose the front of saw blade 31 at the lower surface of the base. In this manner, insert 42 is effective to closely support the upper surface of the workpiece during the cutting action without binding the blade as it flexes or twists in a sawing operation, and yet the insert permits unobstructed visibility of the saw-blade-to-guide-line relation from all angles during the cutting action.

As shown in greater detail in FIGURES 3 to 8, aperture 40 in base 32 has a narrowed rear portion 44 which is undercut by grooves 46 formed in the lower surface of base 32. Grooves 46 extend rearwardly from the front of narrowed portion 44 on either side of the aperture.

Insert 42 is a flat block of transparent material, preferably plastic and may be, for example, an acrylic resin such as methyl methacrylate, commonly known as "Lucite." Insert 42 has longitudinally extending U-shaped groove 50 (best shown in FIGURES 4 and 5) formed in both sides 52 thereof to slidingly engage undercut portions 54 on either side of base aperture 40. Grooved insert 42 and base aperture 40 are proportioned to permit a limited amount of lateral and angular play between the insert and base. However, when base 32 and inert 42 are in engagement with a workpiece surface, the lower surfaces 60 of insert grooves 50 are in contact with the lower surfaces 62 of undercut portions 54 of the base thereby preventing any vertical motion of the insert during the cutting action.

Insert 42 has a blade slot 66 extending forwardly from the rear edge thereof to terminate in a translucent, convex, V-shaped forward end 68 which closely fits the concave, V-shaped cross-sectional profile of blade 31. Insert 42 is provided with vertically extending cylindrical recesses 70 adjacent both sides of blade 31 to the rear of the cutting teeth to accommodate spherical metallic bearing guides 72 which are shown held in place by cement 73 but may also be molded integrally into the insert 42 during the molding process. Guides 72 are effective to prevent relative blade deflections between blade and insert to prevent undue blade wear on the plastic insert material. Instead the insert moves in the plane of the base as the blade deflects during the cutting action to maintain the enclosing alignment between front end 68 of the slot and the blade teeth.

Insert 42 can be readily removed from or inserted in aperture 40 with the blade in place because of the open rear end of blade slot 66. As it is necessary to remove the insert for certain sawing operations such as angle cutting, illustrated in FIGURE 2, this feature is an advantageous convenience. In order to retain insert 42 in base aperture 40, a spring-like strip 74 (FIGURE 6) is mounted as by a screw 76 in the rear of the insert to extend rearwardly from the insert to clip over a suitable lug 78 rigidly mounted on base 32 along the rear edge of aperture 40.

Operation

In operation, blade 31 on its cutting stroke urges the workpiece 82 (FIGURE 7) firmly against the lower surface of transparent insert 42. The material at the forward end 68 of blade slot 66 is effective to firmly hold down the upper portions of the workpiece to prevent the splintering that would otherwise occur if the workpiece material directly in front and to the sides of the blade were unsupported and could lift with the blade on the cutting stroke. As shown in FIGURE 7, on the upwardly directing cutting stroke of the bayonet saw, bayonet saw blade 31 interfits in slot 66 of insert 42 immediately behind its V-shaped front end. In this manner, the apex of V-shaped slot end 68 is effective to hold down the material at the top surface of the workpiece between the oppositely bevelled teeth which form the overall V-shaped profile of the blade.

Translucent front end 68 defines a distinct mark for guiding the bayonet saw through the workpiece. As is apparent from FIGURES 7 and 8, the lower edge of translucent front end 68 and a guide line 80 on the workpiece 82 are both readily visible through the transparent insert. Since the exact point of the workpiece where the leading tips of the blade teeth are cutting is immediately to the rear of translucent end 68, the blade-to-workpiece relation can be accurately controlled. Further, because of the lower edge of translucent front end 68 and the workpiece guide line 80 are in immediate adjacency, no error due to parallax occurs.

As shown in FIGURE 8, on the downwardly-directed return stroke of the bayonet saw, blade 31 is relieved rearwardly away from slot front end 68 to reduce return stroke friction and to allow the bayonet saw as a whole to be advanced along the saw kerf 84.

Modification

A modified embodiment 100 of the insert of the present invention is shown in FIGURES 9 to 14. Insert 100 has U-shaped grooves 102 to slidingly fit in aperture 40 of base 42 in the same manner as does the insert embodiment of FIGURES 3 to 8. Insert 100 is provided with a blade slot 104 extending forwardly from the rear edge of the insert to terminate in a closed, convex, V-shaped forward end 106. Sides 108 of blades slot 104 are cut away in upper and lower bevelled surfaces 110 and 112, respectively, Sides 108 also have formed thereon longitudinally extending cylindrical surfaces 114 to retainingly accommodate spring clips 116 which have a C-shaped cross-section and which extend longitudinally over surfaces 114 along the sides 108 of the blade slot at a location so as to be adjacent the sides of saw blade 31 to prevent twisting and lateral motion of the blade in the insert.

An integral ridge 120 extends transversely across the upper surface of insert 100 at the rear edge thereof. Ridge 120 preferably has a convex V-shape and is engaged by a resilient clip 122 mounted in base 32 as by a screw 124. Clip 122 engages ridge 120 in a manner to permit insert 100 to twist and move laterally within the limits of aperture 40 but to prevent the insert from moving forwardly out of the aperture.

As shown in FIGURES 13 and 14, the blade-insert relationships of this embodiment are similar to those of the insert embodiment of FIGURES 3 to 8. That is, as shown in FIGURE 13, blade 31 on a cutting stroke is immediately adjacent the translucent, V-shaped forward end 106 of the blade slot, and as shown in FIGURE 14, blade 31 is relieved rearwardly from the front of the blade slot on a return stroke of the saw.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In a portable power operated bayonet saw having a base adapted to engage and move along the surface of a workpiece and means adapted to move a saw blade in a cutting stroke and a return stroke through an opening in said base, said blade having teeth projecting from the front edge thereof, a transparent insert having a blade receiving slot, the width of said slot being not substantially greater than the width of said blade, and cooperating tongue and groove means on said base and said insert mounting said insert in said base opening to dispose the sides of said slot closely adjacent the sides of said blade and the closed end of said slot closely adjacent said teeth at least on said cutting stroke to prevent separation of portions of the workpiece along the saw kerf, said cooperating tongue and groove means being adapted to permit relative movement between said transparent insert and said base in the plane of the base while preventing substantial vertical movement of the insert whereby said insert is adapted to move freely relative to the base to follow any twisting and lateral motion of the blade during the cutting action, said blade slot being open at its rearward end and the opening in said base extending to the front edge of said base to permit removal of said insert from said base without prior removal of said blade, and means to detachably retain said insert in said base opening.

2. The combination according to claim 1 wherein said closed end of said slot is V-shaped.

3. The combination according to claim 1 wherein said closed end of said slot is translucent to define a readily visible guide mark for the saw blade.

4. The combination according to claim 1 together with metallic blade guide means carried by said insert at the opposite sides of said slot to minimize wear on said insert.

5. An anti-separation base insert for a bayonet saw comprising a transparent member, mounting means mounting said member on said saw base, means defining a blade passage through said transparent member adapted to closely encompass the front and sides of the path of the bayonet saw teeth at the workpiece surface during the cutting action to fully support the upper surface of a workpiece to prevent lifting of portions thereof, and arcuately surfaced metallic blade guide means on said transparent member adjacent said passage defining means and adapted to prevent relative lateral motion and twisting between the bayonet saw blade and said transparent member, said mounting means restraining said member against movement vertically of said base while permitting relative movement between said transparent member and a saw base in the plane of the base whereby said member is freely movable relative to the base to follow any twisting and lateral motion of the saw blade during the cutting action, the front end of said blade slot being translucent to define a readily visible guide mark for the saw blade, and means on said insert adapted to detachably secure said insert in said base.

References Cited

UNITED STATES PATENTS

| | | | |
|---|---|---|---|
| 48,161 | 6/1865 | Doane | 143—72 |
| 2,077,118 | 4/1937 | Lewis. | |
| 2,854,043 | 9/1958 | Raymond | 143—6 X |
| 2,876,810 | 3/1959 | Peterson et al. | 143—159 |
| 2,996,089 | 8/1961 | McCarty | 143—160 X |

DONALD R. SCHRAN, *Primary Examiner.*